US012688258B2

(12) United States Patent
Thirumal et al.

(10) Patent No.: US 12,688,258 B2
(45) Date of Patent: Jul. 21, 2026

(54) METHOD AND SYSTEM OF CREATING CLUSTERS FOR FEEDBACK DATA

(71) Applicant: Microsoft Technology Licensing, LLC

(72) Inventors: Sathia Prabhu Thirumal, Bothell, WA (US); Christopher Lawrence Laterza, Issaquah, WA (US); Rashmi Mala Brahma, Seattle, WA (US); Pranav Jayant Farswani, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 1091 days.

(21) Appl. No.: 17/497,627

(22) Filed: Oct. 8, 2021

(65) Prior Publication Data

US 2023/0111999 A1    Apr. 13, 2023

(51) Int. Cl.
| | |
|---|---|
| *G06F 18/2411* | (2023.01) |
| *G06F 18/23* | (2023.01) |
| *G06F 18/2413* | (2023.01) |
| *G06Q 10/10* | (2023.01) |
| *G06Q 30/01* | (2023.01) |

(52) U.S. Cl.
CPC .......... *G06F 18/2411* (2023.01); *G06F 18/23* (2023.01); *G06F 18/24137* (2023.01)

(58) Field of Classification Search
CPC .................. G06F 18/2411; G06F 18/23; G06F 18/24137; G06Q 10/10; G06Q 30/01; G06Q 30/0278
See application file for complete search history.

(56) References Cited

U.S. PATENT DOCUMENTS

| | | | |
|---|---|---|---|
| 9,361,368 B1 * | 6/2016 | Patel | G06Q 50/01 |
| 9,799,035 B2 | 10/2017 | Cama et al. | |
| 10,419,820 B2 * | 9/2019 | Foerster | H04N 21/4782 |
| 10,467,261 B1 | 11/2019 | Doyle | |

(Continued)

FOREIGN PATENT DOCUMENTS

| | | | | |
|---|---|---|---|---|
| CN | 112800181 A * | 5/2021 | ......... | G06F 16/3347 |
| CN | 113688161 B * | 10/2024 | .......... | G06F 11/3409 |
| WO | WO-2019133928 A1 * | 7/2019 | ....... | G06F 16/24568 |

OTHER PUBLICATIONS

Sherrick (An Introduction to Graphical User Interfaces and Their Use by CITIS, published Jul. 1992) (Year: 1992).*

(Continued)

*Primary Examiner* — Jennifer N Welch
*Assistant Examiner* — Jake Timothy Breen
(74) *Attorney, Agent, or Firm* — William C. Powell; Newport IP, LLC

(57) ABSTRACT

A method and system for generating clusters for feedback data may include receiving a request for clustering feedback data, the request including one or more parameters relating to the feedback data, retrieving a plurality of vectorized feedbacks stored in a key value format, the key value format including a feedback identifier used as a key for each of the plurality of vectorized feedbacks, creating a plurality of feedback clusters based on the one or more parameters and the retrieved plurality of vectorized feedbacks, the plurality of feedback clusters categorizing at least some of the feedback data into the plurality of feedback clusters, and transmitting data relating to the plurality of feedback clusters for display on a user interface screen.

19 Claims, 10 Drawing Sheets

200B

Feedback Clustering

210 — 220 — 230 — 240 — 250 —

| Select Source | Select Platform | Advanced Filters | Date Range | Create Clusters |

260 — 270 —

| Expand into More Clusters | Collapse into Fewer Clusters |

280

| Cluster Count: 24 | Number of Feedback in Selected Filters: 3857 | Number of Feedback in Clusters: 793, 20.2% | Uncategorized Clusters: 3,098, 78.3% |

290

| Cluster Name | Sample Feedback Comment | Cluster Size | Average Feedback Size |
|---|---|---|---|
| Cluster 1 | Too slow | 94 | 26 |
| Cluster 2 | Not user friendly | 73 | 123 |
| Cluster 3 | Makes my computer crash | 68 | 60 |

(56) References Cited

U.S. PATENT DOCUMENTS

| 11,210,721 | B1 * | 12/2021 | Feng | G06Q 30/0631 |
| 2018/0260860 | A1 * | 9/2018 | Devanathan | G06F 16/353 |
| 2019/0347668 | A1 | 11/2019 | Williams et al. | |
| 2020/0019611 | A1 | 1/2020 | Tutubalina et al. | |
| 2020/0387570 | A1 | 12/2020 | Biswas et al. | |
| 2021/0073196 | A1 * | 3/2021 | Schub | G06F 16/221 |
| 2021/0150546 | A1 * | 5/2021 | Zhu | G06Q 30/0282 |

OTHER PUBLICATIONS

Amazon AWS (What Is a Key-Value Database?, archived Aug. 12, 2021) [online] <URL:https://web.archive.org/web/20210812025327/https://aws.amazon.com/nosql/key-value/>. (Year: 2021).*
"International Search Report and Written Opinion Issued in PCT Application No. PCT/US22/038259", Mailed Date: Oct. 17, 2022, 9 Pages.
"Sentiment Analysis: A Definitive Guide", Retrieved from: https://monkeylearn.com/sentiment-analysis/, Feb. 25, 2021, 29 Pages.
Aguwa, et al., "Modeling of Fuzzy-Based Voice of Customer for Business Decision Analytics", In Knowledge-Based Systems, vol. 125, Jun. 1, 2017, 11 Pages.
Evan, Glazer, "Automating Customer Feedback with Machine Learning", Retrieved from: https://www.cloudbees.com/blog/automating-customer-feedback-with-machine-learning, May 16, 2018, 10 Pages.
Oelke, et al., "Visual Opinion Analysis of Customer Feedback Data", In IEEE Symposium on Visual Analytics Science and Technology, Oct. 12, 2009, 8 Pages.
Snyder, Robin M., "An Introduction to Topic Modeling as an Unsupervised Machine Learning Way to Organize Text Information", In Proceedings of Association Supporting Computer Users in Education, Jun. 14, 2015, pp. 86-96.

* cited by examiner

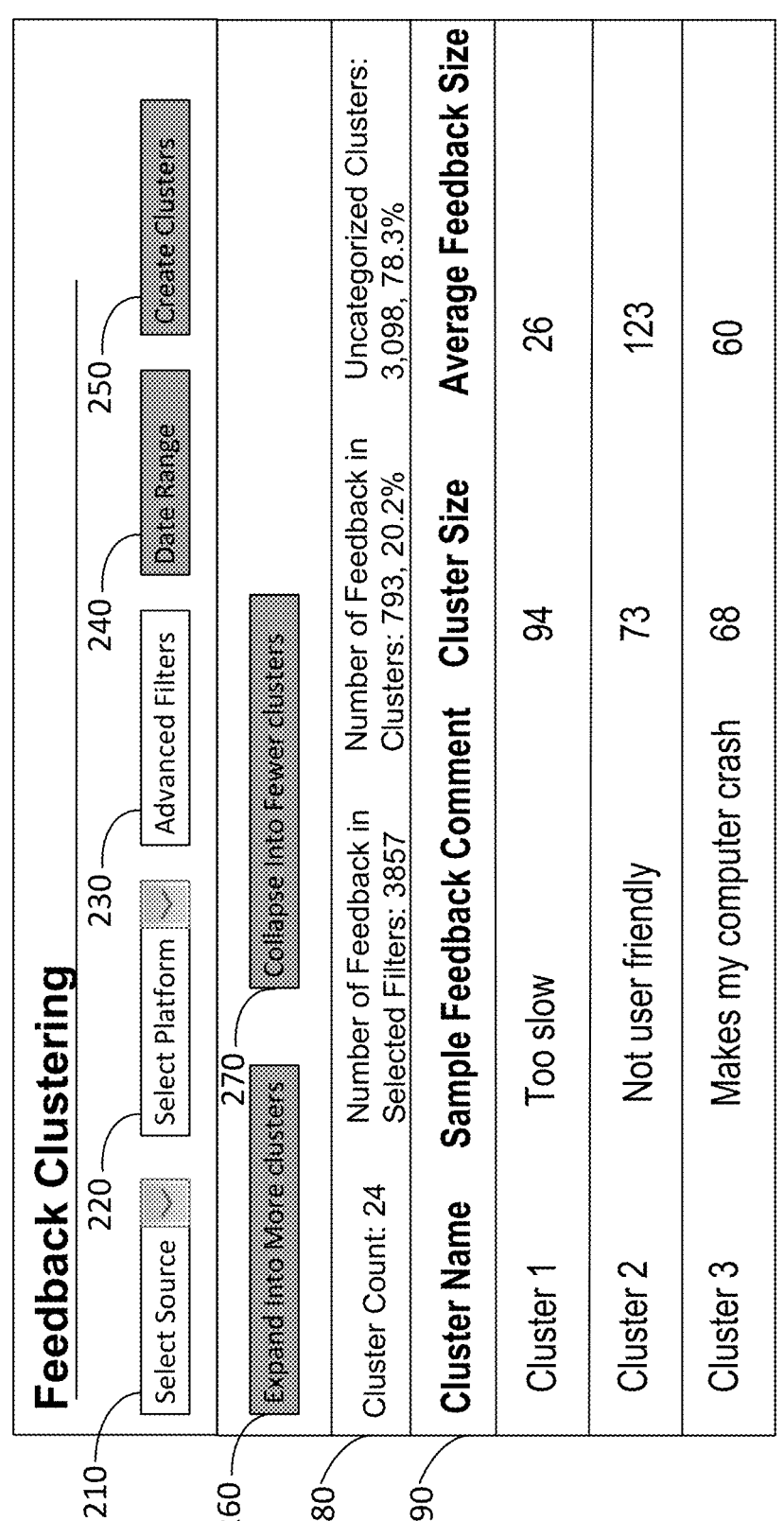

FIG. 2B

| Cluster Name | Sample Feedback Comment | Cluster Size | Average Feedback Size |
|---|---|---|---|
| Cluster 1 | Too slow | 94 | 26 |
| Cluster 2 | Not user friendly | 73 | 123 |
| Cluster 3 | Makes my computer crash | 68 | 60 |

Feedback Clustering

Select Source    Select Platform    Advanced Filters    Date Range    Create Clusters Expand Into More clusters    Collapse Into Fewer clusters Cluster Count: 24

Number of Feedback in Selected Filters: 3857

Number of Feedback in Clusters: 793, 20.2%

Uncategorized Clusters: 3,098, 78.3%

200B

400

405

BEGIN

410

RECEIVE REQUEST TO CLUSTER FEEDBACK DATA

415

CREATE A DATA QUERY BASED ON THE RECEIVED REQUEST

420

TRANSMIT THE DATA QUERY FOR CLUSTERING FEEDBACK DATA

425

RETRIEVE VECTORS ASSOCAITED WITH THE DATA QUERY FROM A STORAGE MEDUIM

430

USE THE RETRIEVED VECTORS TO CREATE A PLURALITY OF CLUSTERS

435

TRANSMIT DATA RELATING TO THE CLUSTERS FOR DISPLAY

440

END

METHOD AND SYSTEM OF CREATING CLUSTERS FOR FEEDBACK DATA

BACKGROUND

Enterprises often rely on user feedback to measure customer satisfaction and identify areas for improvement. User feedback may involve users submitting a rating score or providing written comments. While rating scores may provide an overall understanding of a level of customer satisfaction, they may not be able to help in identifying issues that require attention or need improvement. Identifying particular areas for improvement often requires reviewing and/or analyzing written comments. Reviewing and analyzing written feedback, however, may require substantial time and effort. This is particularly the case for companies that have many products or services and/or a large user population. That is because, while companies with small user populations may be able to review each written comment individually or manually create categories of user feedbacks to identify issues or areas that require improvement, such tasks may be very challenging with large user populations. When significant numbers of comments are received frequently, reviewing each comment individually becomes time prohibitive.

Furthermore, even if one or more employees are assigned to the task of reviewing comments individually, categorizing the comments into specific categories and determining which categories have received more comments can be a very complex task. This can be made even more challenging, when new feedback is received every day, which may require creating new categories or editing existing categories of feedback.

Hence, there is a need for improved systems and methods of enabling review and analysis of feedback data.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request for clustering feedback data, the request including one or more parameters relating to the feedback data, retrieving a plurality of vectorized feedbacks stored in a key value format, the key value format including a feedback identifier used as a key for each of the plurality of vectorized feedbacks, creating a plurality of feedback clusters based on the one or more parameters and the retrieved plurality of vectorized feedbacks, the plurality of feedback clusters categorizing at least some of the feedback data into the plurality of feedback clusters, and transmitting data relating to the plurality of feedback clusters for display on a user interface screen.

In yet another general aspect, the instant disclosure presents a method for generating clusters for feedback data. In some implementations, the method includes receiving a request for clustering feedback data, the request including one or more parameters relating to the feedback data, retrieving a plurality of vectorized feedbacks stored in a key value format, the key value format including a feedback identifier used as a key for each of the plurality of vectorized feedbacks, creating a plurality of feedback clusters based on the one or more parameters and the retrieved plurality of vectorized feedbacks, the plurality of feedback clusters categorizing at least some of the feedback data into the plurality of feedback clusters, and transmitting data relating to the plurality of feedback clusters for display on a user interface screen.

In a further general aspect, the instant application describes a non-transitory computer readable medium on which are stored instructions that when executed cause a programmable device to receive a request for clustering feedback data, the request including one or more parameters relating to the feedback data, retrieve a plurality of vectorized feedbacks stored in a key value format, the key value format including a feedback identifier used as a key for each of the plurality of vectorized feedbacks, create a plurality of feedback clusters based on the one or more parameters and the retrieved plurality of vectorized feedbacks, the plurality of feedback clusters categorizing at least some of the feedback data into the plurality of feedback clusters, and transmit data relating to the plurality of feedback clusters for display on a user interface screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A-2B depict example GUI screens of a feedback review and analysis application or service.

DETAILED DESCRIPTION

Figure 1A:
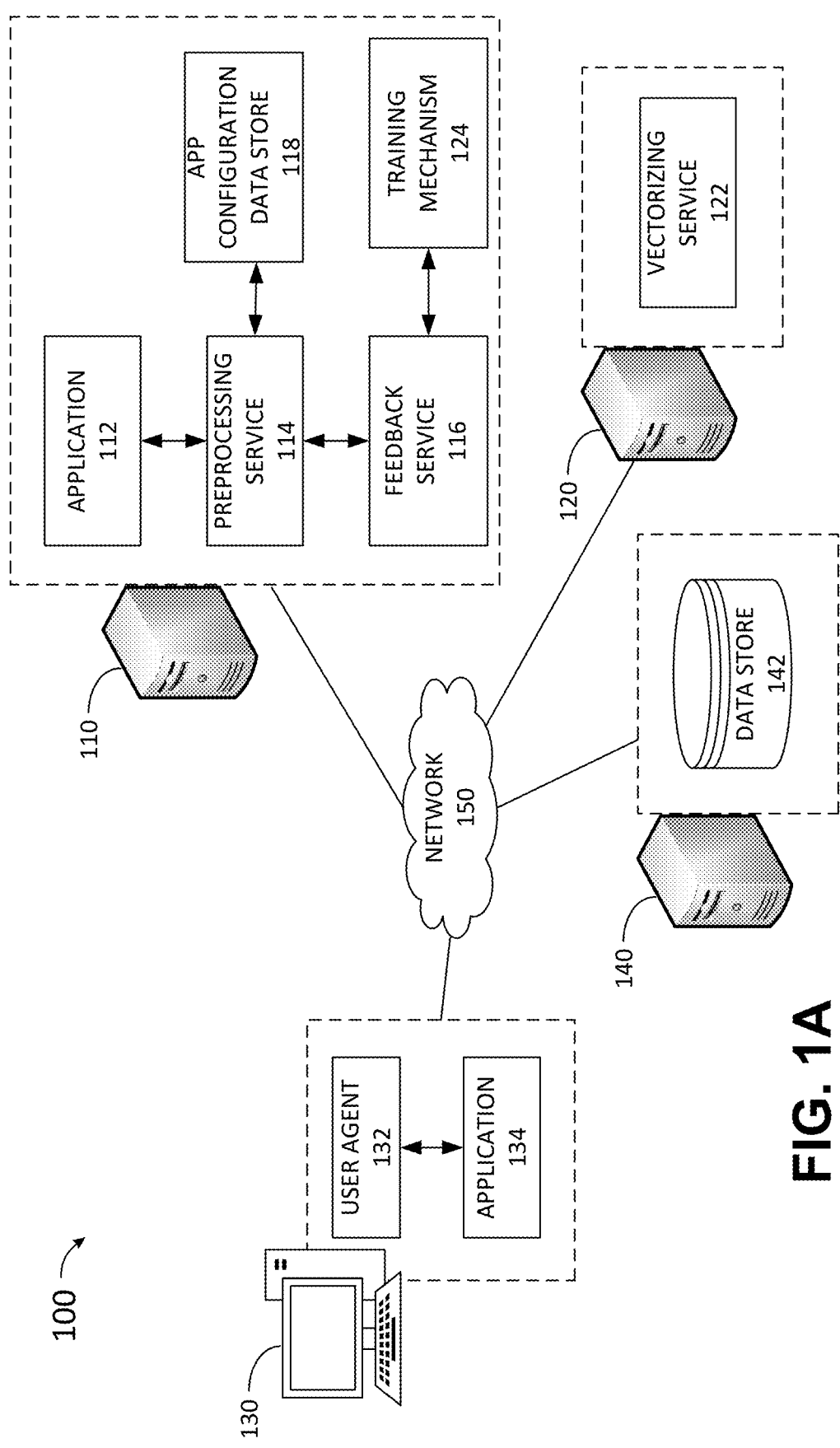
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

With the increased use of cloud services, Internet products, and applications that enable users to provide feedback at any time, enterprises such as application development companies, manufacturers and retailers receive vast amounts of feedback from their customers on a daily basis. This feedback can be an important source of information for a company. For example, the feedback can assist in identifying issues and making improvements to products or services. User feedback can take many forms. For example, feedback may include a ranking score (e.g., a Net Promoter Score, a 5-star review arrangement and the like) and/or verbal or written comments. While ranking scores can be analyzed and reviewed systematically, evaluating written comments may be challenging. That is because written feedback is often unstructured by nature. Moreover, for companies with large user populations, there are often too many user comments to read through sequentially and/or to classify into different categories for analysis. Reviewing and analyzing such feedback comments can be time and cost prohibitive. As a result, actionable insight may not be readily available from the feedback received and much of the feedback may wind up being ignored. As such, there exists a technical problem of lack of adequate mechanisms for enabling companies to review and/or analyze user feedback in a timely and efficient manner.

Furthermore, even if a company dedicates the time and resources required to review and analyze numerous feedback comments, it can be very difficult for humans to classify the hundreds or thousands for feedback comments into separate categories, identify patterns, and/or analyze the data overtime. This is particularly the case when comments are received on a daily basis, and as such classifications and patterns may change quickly. Analyzing recent feedback and determining if changes to the classifications are needed often takes time to process. As a result, current mechanisms for feedback analysis often introduce a delay in the analysis that prevents real-time improvements based on recently received feedback. Moreover, currently used mechanisms do not enable interactions for improving the analysis as more data is gathered. As such, there exists another technical problem of lack of adequate mechanisms for enabling real-time review and classification of user feedback.

To address these technical problems and more, in an example, this description provides technical solutions for intelligently and automatically clustering feedback data into a plurality of clusters. This may be achieved by utilizing a vectorization process that individually analyzes and creates vectors for each received feedback. The vectors may be high-dimensional feature vectors that enable the user to filter the feedback data across many dimensions. The vectorized feedback data may be stored in a key value format, which includes a feedback identifier as a key. The feedback data may be stored in both a long-term storage medium and a short-term storage medium. Based on selected feedback dimensions, a filtered list of feedback identifier keys may be used to create a plurality of feedback clusters that are then provided for display to the user. The technical solution may also provide an intuitive and interactive user interface (UI) that allows a user to visually filter feedback data across one or more dimensions, expand or collapse feedback clusters, change a relevance score and/or drill down to individual feedback comments. In this manner, the technical solution enables real-time review and analysis of feedback that is classified into a plurality of clusters based on user selected filters.

As will be understood by persons of skill in the art upon reading this disclosure, benefits and advantages provided by such implementations can include, but are not limited to, a technical solution to the technical problems of lack of mechanisms for efficient and user-friendly review and/or analysis of user feedback in real-time. Technical solutions and implementations provided herein offer a mechanism for vectorizing and storing recently received feedback in a timely manner such that the vectorized data can be used to cluster the feedbacks based on user selected parameters and enable the user to interactively review and analyze the feedback data. The benefits made available by these technology-based solutions provide a user-friendly mechanism for review and analyses of feedback data in near real-time.

As used herein, the terms "feedback," may refer to any spoken or written comments and rating scores received from users of products and/or services relating to the products and/or services. Furthermore, as used herein, the term "written feedback" or comment may refer to any textual feedback input received from one or more users. The textual feedback input may be received from a written input (e.g., via text entered into a user interface element) or audio feedback that has been converted to text.

FIG. 1A illustrates an example system 100, upon which aspects of this disclosure may be implemented. The system 100 may include a server 110, which may itself include an application 112, preprocessing service 114, feedback service 116, app configuration data store 118 and training mechanism 124. While shown as one server, the server 110 may represent a plurality of servers that work together to deliver the functions and services provided by each service or application included in the server 110. The server 110 may operate as a shared resource server located at an enterprise accessible by various computer client devices such as a client device 130. The server 110 may also operate as a cloud-based server for offering feedback services in one or more applications such as application 112 and/or application 134.

The server 110 may include and/or execute a preprocessing service 114, which may provide preprocessing of requests received from users utilizing a feedback review and/or analysis application (e.g., application 112 or application 134). In some implementations, the preprocessing service 114 may function as a middle tier service in the fabric. The preprocessing service 114 may operate to examine a request for clustering of feedback data received from a user's client device via an application (e.g., applications 112 or applications 134). Upon examining the request, the preprocessing service 114 may identify dimensions selected as filters for the resulting clusters and create a data query based on the selected dimensions for transmission to the feedback service 116. To create the data query, the preprocessing service 114 may access data from the app configuration data store 118, which contains configuration values. For example, the preprocessing service 114 may access and retrieve information relating to the model being currently used for vectorizing the feedback data. In an example, the information relating to the model may include a model identifier (e.g., model ID).

Furthermore, the preprocessing service 114 may assist with requests relating to user interactions with the visual data provided in the feedback review and/or analysis application. For example, when the user chooses to view individual feedback comments, the request may be received by the feedback review and/or analysis application which may identify a feedback identifier key associated with the individual feedback comment and look up the identifier key in a key-value store to identify the vector associated with the feedback. The vector may then be used to retrieve the individual feedback.

Once a clustering data query is created by the preprocessing service 114, the data query may be transmitted to the feedback service 116, which may process the data query to create the desired feedback clusters. The feedback service 116 may include multiple services and elements that operates together to provide feedback clustering services. One or more elements of the feedback service 116 may include Machine learning (ML) models that analyze data to provide the desired outputs. The various elements of the feedback service 116 are discussed in more detail with respect to FIG. 1B.

The system 100 may also include a server 120 which may host a vectorizing service 122. The vectorizing service 122 may retrieve recently received feedback data from a data store such as the data store 142 and create vectors for each feedback data (e.g., feedback comment). In some implementations, the vectorizing service 122 may include one or more ML models as discussed further below with respect to FIG. 1C. The models utilized by the vectorizing service 122 may operate to vectorize newly received feedback, as needed, or based on a predetermined schedule. In this manner, recent feedback is quickly processed and vectorized. The recent feedback can then be taken into account when creating clusters such that the clusters provide a near real-time review of feedback data.

One or more ML models implemented by the feedback service 116 and/or vectorizing service 122 may be trained by the training mechanism 124. The training mechanism 124 may use training data sets stored in the data store 142 to provide initial and ongoing training for each of the models. Alternatively, or additionally, the training mechanism 124 may use training data sets from elsewhere. In some implementations, the training mechanism 124 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of an ML model to perform natural language processing (NLP), vectorize data and/or create clusters. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words, identify keywords and/or classify content. Such training may be made following the accumulation, review, and/or analysis of data (e.g., user data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 140 which may be connected to or include the data store 142 which may function as a repository in which databases relating to training models, data relating to user feedback, vectorized feedback data and/or data relating to feedback clusters may be stored. Although shown as a single data store, the data store 142 may be representative of multiple storage devices and data stores which may be accessible by one or more of the preprocessing service 114, feedback service 116, training mechanism 124, and vectorizing service 122.

The client device 130 may be connected to the server 110 via a network 150. The network 150 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail with respect to FIGS. 5 and 6.

The client device 130 may include a local application 134. The application 134 may be a computer program executed on the client device that configures the device to be responsive to user input to allow a user to interactively review and/or analyze feedback data. As such, the application 134 may be a local feedback review and/or analysis application. In some examples, the feedback review and/or analysis application used to review and analyze feedback is executed on the server 110 (e.g., application 112) and provided via an online service. In some implementations, web applications communicate via the network 150 with a user agent 132, such as a browser, executing on the client device 130. The user agent 132 may provide a user interface that allows the user to interact with the application 112. User data from the application 134 or application 112 may be provided via the network 150 to the preprocessing service 114 for use in providing feedback service.

Figure 1B:
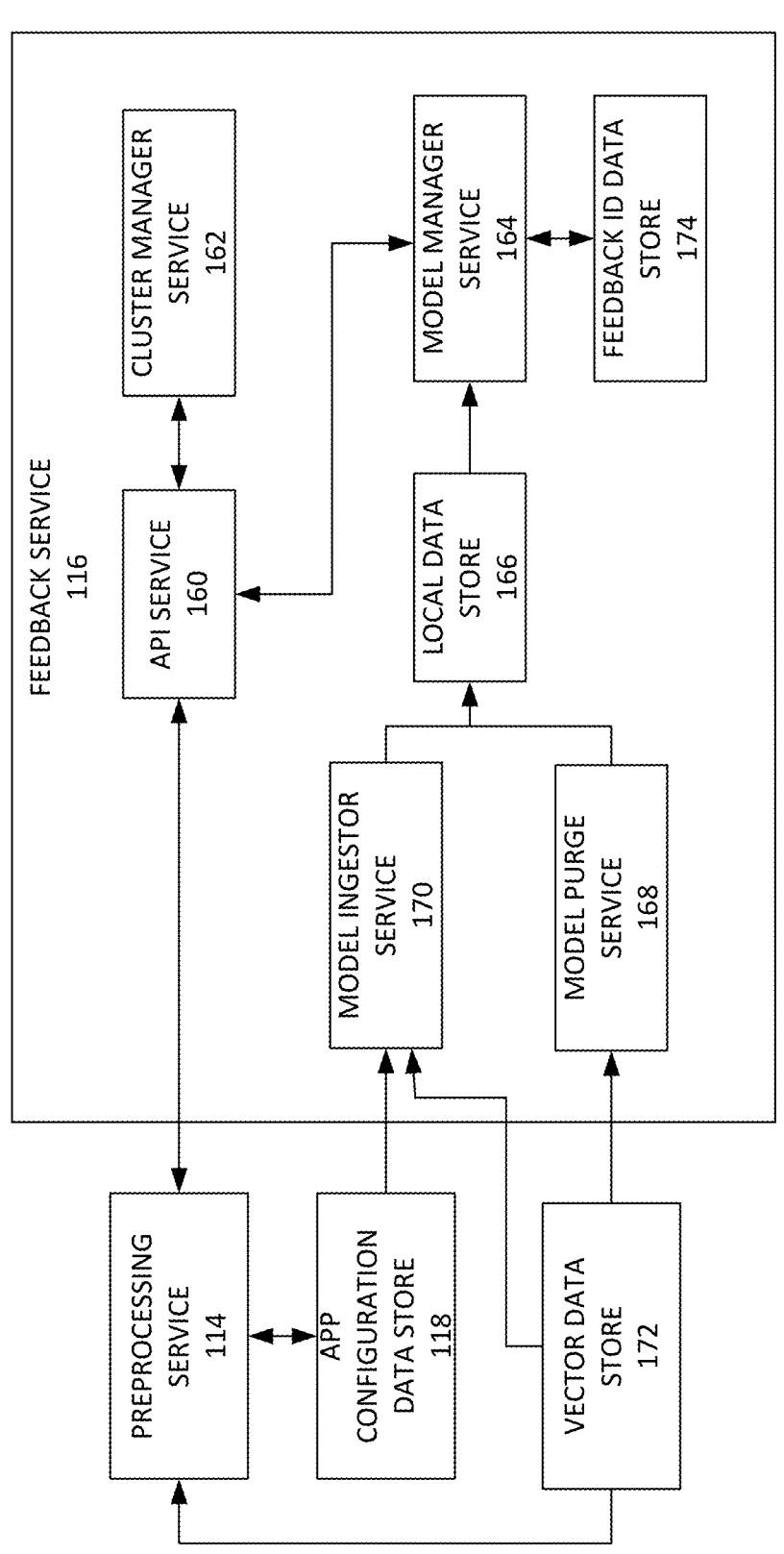
FIG. 1B depicts an example data flow between some elements of an example system upon which aspects of this disclosure may be implemented.

FIG. 1B depicts an example data flow between some of the elements of the example system 100. As discussed before, the preprocessing service 114 may receive a request for clustering feedback data based on one or more filter parameters. The filter parameters may correspond to dimensions relating to the feedback data and may include the name of a product or service to which the feedback relates, a time period during which the feedback is received, a ranking score associated with the feedback, a type of device associated with the feedback (e.g., for feedback relating to software, the type of computer device used by the software), a geographical location associated with the user providing the feedback and the like. The preprocessing service 114 may retrieve configuration information from the app configuration data store 118 and/or access a different data store to retrieve vector related data to create one or more data queries for the request.

The data query may then be transmitted to an API service 160 of the feedback service 116. The API service 160 may provide authentication services and determine what service or element each request or message should be transmitted to. For example, once a data query is authenticated, the API service 160 may route the request to a model manager service 164 for processing. The model manager service 164 may examine the received query to identify the vector dimensions associated with the query. The model manager service 164 may then submit a query based on the identified dimensions to a feedback ID data store 174.

The feedback ID data store 174 may be a local or remote storage medium that stores a database that functions as a master feedback ID key store. The master feedback ID key store may maintain a list of feedback ID keys and/or their associated vector key values. In response to the query, the model manager service 164 may receive a list of feedback ID keys. The feedback ID keys may then be used by the model manager service 164 to transmit a request for matching vectors to the local data store 166. In response to the request, the model manager service 164 may receive a list of vectors from the local data store 166. The local data store 166 may be a local cache that stores vectorized feedback locally and as such is easily accessible by the elements of the feedback service 116.

Once the vectorized feedback is received from the local data store 166, the model manager service 164 may transmit the vectors to the API service 160. In turn, the API service 160 may forward the received vectors to a cluster manager service 162 for further processing. Upon receiving the vectors, the cluster manager service 162 may operate to create cluster groups for the received vectors. To achieve this, the cluster manager service 162 may utilize one or more clustering algorithms. The clustering algorithms may include one or more ML models. In an example, the clustering algorithm used is a Hierarchical Density-Based Spatial Clustering of Applications with Noise algorithm (HDB-SCAN). Once the clusters are created, the cluster manager service 162 may store the clusters, as well as metadata relating to the clusters in a storage medium. In an example, the storage medium is the local data store 166. In another example, the storage medium used for storing the clusters is an external cache, such that the vectors and the clusters are stored separately.

After the cluster groups have been generated and stored, the cluster manager service 162 may transmit a message to the API service 160 to provide notification that clustering was performed successfully. This message may be transmitted by the API service 160 to the preprocessing service 114, which may in turn, forward the message to the application from which the original request for clustering was received (e.g., application 112 or 134). In response, the application may then transmit a request for receiving information about the cluster groups. The request may be routed via the preprocessing service 114 to the API service 160 and in turn to the cluster manager service 162. In response, the cluster manager service 162 may retrieve information relating to the generated clusters from the storage medium at which they are stored and provide the retrieved information for routing back to the application.

In some implementations, the feedback service 116 includes a model ingestor service 170 and a model purge service 168. The model ingestor service 170 may operate to retrieve recently generated vectors from a vector data store 172 and prepare the retrieved vectors for storage in the local data store 166. Preparing the vectors for storage may involve organizing the data in a key value format for storage. In some implementations, the key stores information about the model that was used to create the vector, the version of the model, vector identification information, sentence identifier (which may be derived from the feedback identifier) and the like. To identify the model that created the vector(s), the model ingestor service 170 may communicate with the app configuration data store 118 to retrieve information about the model. The information may include a model ID for the model which may be stored in the app configuration data store 118. Once the vectors are prepared for storage, the model ingestor service 170 may transmit the key value information to the local data store 166 for storage.

In some implementations, the vectors stored in the local data store 166 are stored for a limited time period. After the time period ends, the vectors may be deleted to create space for more recent vectors. This is because feedback data may be received continuously (e.g., on a daily or weekly basis) and after a certain time period old feedback may no longer be used for creating clusters. The time period for keeping vectors in the local data store 166 may vary. In an example, vectors remain in the local data store 166 for three months. In another example, vectors are kept for a period of one year.

In some implementations, removal of outdated vectors from the local data store 166 is achieved by the model purge service 168. The model purge service 168 may identify outdated vectors via their model ID. This may be done by retrieving model ID information for models that were used in a specific time frame (e.g., more than three months ago) and are no longer being used. This information may be retrieved from the vector data store 172, as the vector data store 172 may store a data structure (e.g., data table) relating to the models used for creating vectors. Once the model ID information is retrieved, the model purge service 168 may query the local data store 166 for vectors associated with the model ID information. After those vectors are identified, the model purge service 168 may submit a request for purging the key values associated with the identified vectors from the local data store 166. In this manner, the model purge service 168 may delete vectors that were made by obsolete models. Alternatively, or additionally, the model purge service 168 may delete vectors based on a time period (e.g., delete vectors that have been stored for more than a year).

In contrast to the local data store 166 which stores the vectors temporarily, the vector data store 172 may be a storage medium for persistent and/or long-term storage of vectors. In this manner, while vectors associated with older feedback data are not used for creating cluster groups of feedback, the feedback data may still be available for analysis if overtime analysis of feedback data is required. It should be noted that each of the API service 160, cluster manager service 162, model manager service 164, model ingestor service 170 and model purge service 168 may include one or more ML models.

Figure 1C:
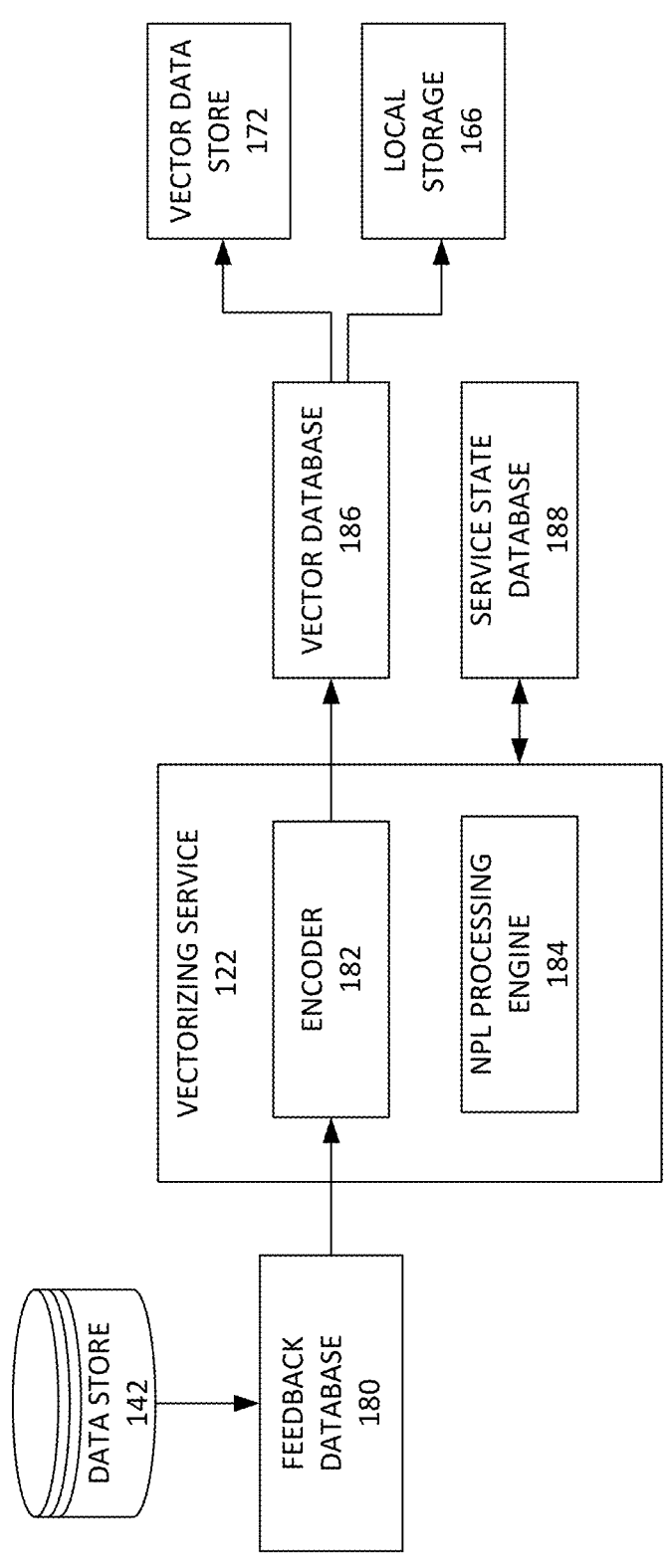
FIG. 1C depicts some elements of an example system upon which aspects of this disclosure may be implemented.

FIG. 1C depicts some of the elements of the example system 100. In some implementations, raw feedback data received from users is stored in the data store 142. In an example, the feedback data may be processed and then stored in a feedback database 180. The feedback database 180 may include data from various feedback mechanisms such as NPS surveys, send a smile feedback, financial performance surveys (FPS), customer reviews and the like. Some of the feedback data may include written comments (e.g., text input). Each written feedback comment may include one or more sentences. In some implementations, written feedback is stored in a tabular data structure. In an example, each written feedback is parsed into individual sentences that make up the written feedback and each individual sentence is stored as a separate data entity, having a unique sentence identifier (e.g., sentence ID), as well as a feedback identifier (e.g., feedback ID key). The feedback identifier may be an identifier key that is unique to each feedback (e.g., written feedback, rating scores, and the like). For written feedback that includes multiple sentences, the same feedback identifier may be used for each sentence, such that, even when a feedback comment is parsed into individual sentences, the feedback identifier can be used to look up and recreate the entire original written feedback. As such, the feedback database 180 may include one or more data structures (e.g., tabular data structures) that store feedback data. Different types of feedback data may be stored in separate data structures. For example, written comment is stored in a written comment tabular data structure, while rating scores are stored in a separate tabular data structure. Sometimes, written comment accompanies a rating score. For example, some feedback mechanisms allow the users to provide a rating score and provide written comment. In such cases, the written comment and rating score may be tagged with the same feedback identifier key so that even if the written comment is processed and/or stored separately from the rating score, they can be linked and reviewed as a unit, when needed.

When new feedback is received, it may be processed and stored in the feedback database 180. The new feedback may then be transmitted to the vectorizing service 122 to be vectorized. Thus, the vectorizing service 122 may be invoked each time new feedback is stored in the feedback database 180. In some implementations, the vectorizing service wakes up based on a predetermined schedule (e.g., every minute or every 5 minutes) and transmits a query to determine whether there is new feedback data in the feedback database 180 to process. The new feedback data may be transmitted to and processed by the vectorizing service 122 in batches.

The vectorizing service 122 may include one or more ML models, such as the encoder 182 that receive the individual feedback sentences and process them via NLP processing to create a vector representation for each sentence (e.g., vector embeddings). The encoder 182 may be a universal sentence encoder that includes one or more ML models (e.g., NLP models). In an example, the ML models include a customized version of Doc2Vec. To accurately process and vectorize each feedback sentence, the vectorizing service may also include an NLP processing engine 184. The NLP processing engine 184 may include various additional components that operate with the encoder 182 to create vector representations for feedback sentences. The additional components included in the NLP processing engine 184 may include NLP batch components and other components such as Crontab scheduling, authentication engine, and database utility tools such as DBUtils. The NLP processing engine 184 may retrieve and/or transmit state data to a service state database 188. The service state database 188 may include one or more data structures (e.g., tables) that store vector model service states and/or service information.

Once the vector representations are created, the vectorizing service 122 may provide the new vector representations as an output to the vector database 186. The vector database 186 may be a model state database. In some implementations, the vector database 186 is a Structured Query Language (SQL) database. The vector database 186 may store each vector representation in a vector state along with metadata associated with the vector. The metadata may include information about the feedback comment from which the vector originates (e.g., sentence ID and/or feedback ID key), the model ID for the vector model that created the vector, time information relating to when the feedback was received, and the like. The vector database 186 may be stored in a permanent or long-term storage medium such as the vector data store 172. Furthermore, the vector database 186 may be transmitted to the local data store 166 for short-term storage and easy retrieval. In some implementations, newly added rows of the vector database table are transmitted to the vector data store 172 and/or local storage 166 when new vector representations are created. In this manner, vectorization of feedback occurs in near real-time, as feedback data is received. This enables the technical solution to provide for review and analysis of feedback data in a near real-time fashion. Furthermore, the vectorization of feedback data may occur in an offline manner such that the vectorizing process does not adversely affect (e.g., slow down or decrease efficiency of) the feedback service 116.

Figure 2A:
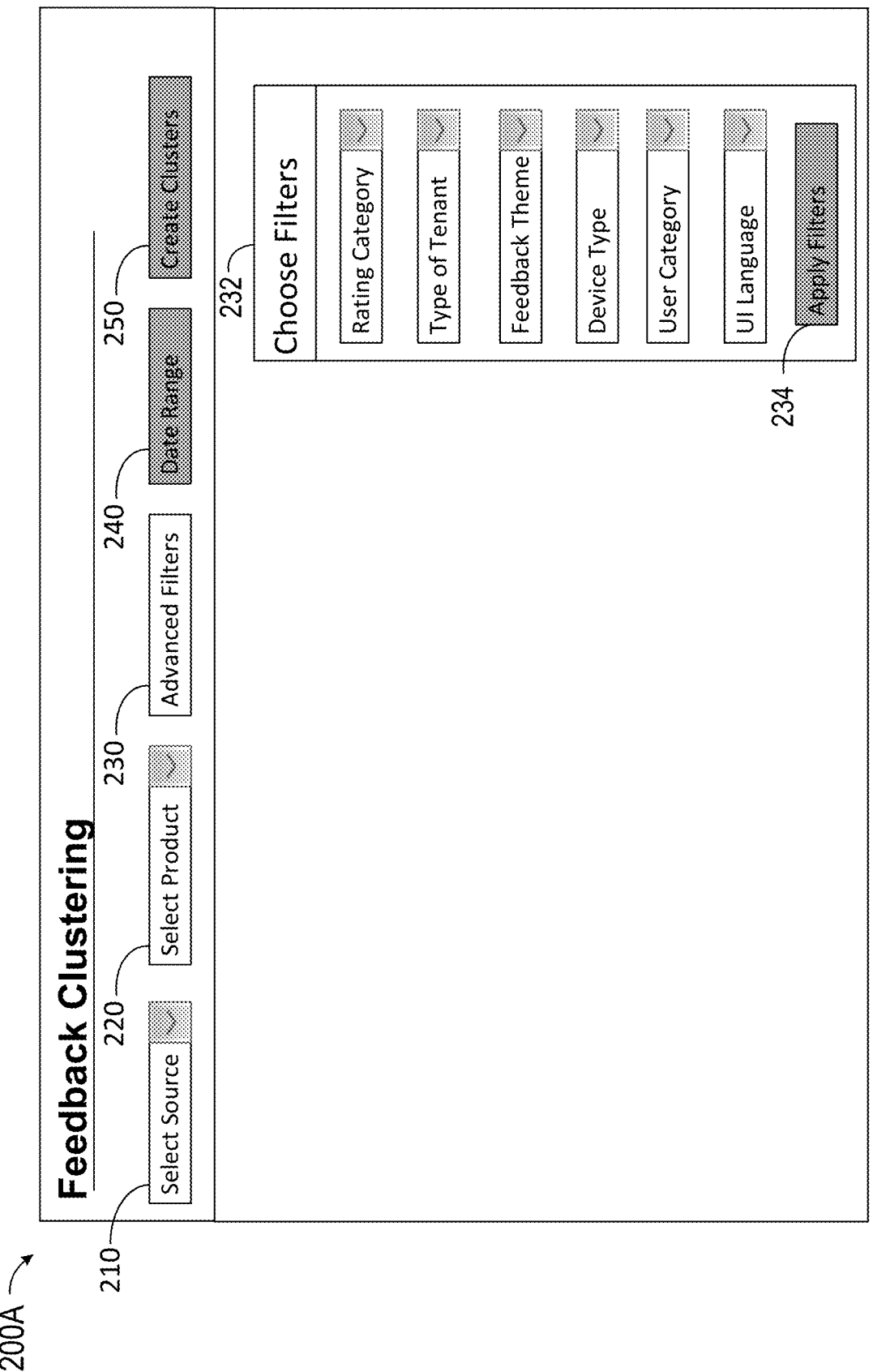

FIGS. 2A-2B depict example GUI screens of a feedback review and analysis application or service. The GUI screen 200A of FIG. 2A may, for example, be displayed by a feedback review and analysis application when the application is first opened. In an example, the GUI screen 200A of the feedback review and analysis application or service may include a plurality of UI elements (e.g., UI menu options) for selecting parameters for the feedback the user is interested in reviewing. The UI elements may include a UI element 210, which may be a dropdown menu option for selecting a source for the feedback. The source may be indicative of the type of feedback received. For example, the source may include options such as end user NPS surveys, FPS, user feedback received directly from a product page or software application, customer reviews and the like. In addition to enabling the user to select the source, the GUI screen 200A may also provide a UI element 220 for allowing the user to select the product for which feedback is being reviewed. This may be useful for enterprises that offer multiple products and/or services. The products may include platforms (e.g., Windows® 10), specific software applications (e.g., Microsoft® Word), and the like.

Moreover, GUI screen 200A may enable the user to add more filters for the feedback data they are interested in reviewing via the UI element 230. In some implementations, selection of the UI element 230 (e.g., clicking on the UI element 230) results in the display of the additional filters UI element 232. The additional filters displayed in the UI element 232 may vary depending on the product and/or enterprise. When the feedback data includes user ratings scores, the additional filters may include an option for choosing a rating category. For example, if the rating scores rate a product from 1 to 5, the rating categories may include each of the rating scores 1, 2, 3, 4 and 5. For software application products that are offered to tenants, the additional filters may include an option for selecting the type of tenant (e.g., educational, government, or private enterprise), an option for choosing a device type (e.g., mobile device or desktop), an option for selecting a user category (e.g., tenant user or individual customer), and/or an option for selecting the UI language associated with the user that submitted the feedback (e.g., U.S. English, Japanese, etc.). Depending on the type of product selected, many more types of filters may be made available to the user to select from. Once the desired filters are selected, a UI element 234 may be used to apply the filters.

In some implementations, access restrictions may be implemented to prevent unauthorized users from accessing or reviewing feedback data. As a result, not all users may have access to all products and/or filters. The ability to select a given product and/or source may thus depend on permissions associated with a given user. In some implementations, the permissions are automatically set based on a user's role, a team to which the user belongs and the like.

GUI screen 200A may also include a UI element 240 for enabling the user to select a date range for the feedback data they are interested in reviewing. The date range may allow the user to select specific dates or choose a date range (e.g., last 60 days, last 6 months, this year, etc.). Once all desired parameters have been selected, the UI element 250 may be invoked to create clusters based on the selected parameters. Upon selection of the UI element 250, a request for creating clusters may be transmitted from the feedback review and analysis application or service to a feedback service for generating the clusters. The request may include the selected parameters. The selected parameters may then be used by the feedback service to retrieve vector representations that correspond to the selected parameters before generating the desired clusters.

Once the clusters are created, a GUI screen such as the GUI screen 200B of FIG. 2B may be displayed to the user. The GUI screen 200B may include the UI elements 210, 220, 230, 240 and 250 to enable the user to modify their selected parameters, when needed. Furthermore, the GUI screen 200B may include a cluster information portion 280 for displaying information about the clusters that were generated. The cluster information may include the number of clusters generated (e.g., cluster count), the number of feedback comments that correspond with the selected parameters, number of feedback comments in the generated cluster and number of uncategorized feedback comments. The information portion may also include percentages for the number of feedback comments in the generated clusters and the number of uncategorized feedback comments. The uncategorized feedback comments may represent feedback comments that do not fall into a cluster. This may occur for feedback comments that seem unrelated to other feedback comments and as such do not fall into a common category of feedback comments. This is because, while the feedback service is used for clustering feedback comments, not all comments can fall into a defined cluster as other comments. As such, the feedback service may not cluster at least some of the feedback comments.

The GUI screen 200B may also include a cluster portion 290, which may display a list of clusters that have been generated. The cluster portion 290 may include a column of cluster names. In some implementations, the cluster names may include sequential numbers for simply numbering the clusters. In other implementations, the cluster names may be derived from keywords associated with each cluster. For each cluster name, the cluster portion 290 may display a sample feedback comment. The sample feedback comment may be a randomly selected feedback comment from the comments that form a given cluster. Alternatively, the sample feedback comment may be a comment that has a high likelihood of being associated with the cluster (e.g., having a high relevance score). In some implementations, hovering over or otherwise selecting a sample feedback comment results in display of a pop-up UI element that presents the full feedback comment (e.g., when the feedback comment is too long to display in the content portion 290) and/or display of additional feedback comments in the cluster.

The cluster portion 290 of the GUI screen 200B may also include a cluster size indication for displaying the size of each cluster and an average feedback size indication for displaying the average size of feedback comments in the cluster. Cluster size may refer to the number of feedback comments in each cluster. The average size of feedback comments in the cluster may refer to the average number of characters in each feedback comment in the cluster.

To enable the user to interactively modify the generated clusters, the GUI screen 200B may also include a UI element 260 for expanding the results into more clusters and a UI element 270 for collapsing the results into fewer clusters. Expanding the results into more clusters may be utilized when the user desires to generate more clusters that may not be as closely related to each other. Collapsing the results into more clusters, on the other hand, may result in creation of fewer clusters. The fewer clusters may include feedback comments that are less closely associated with each other (e.g., lower relevance score).

Figure 3A:
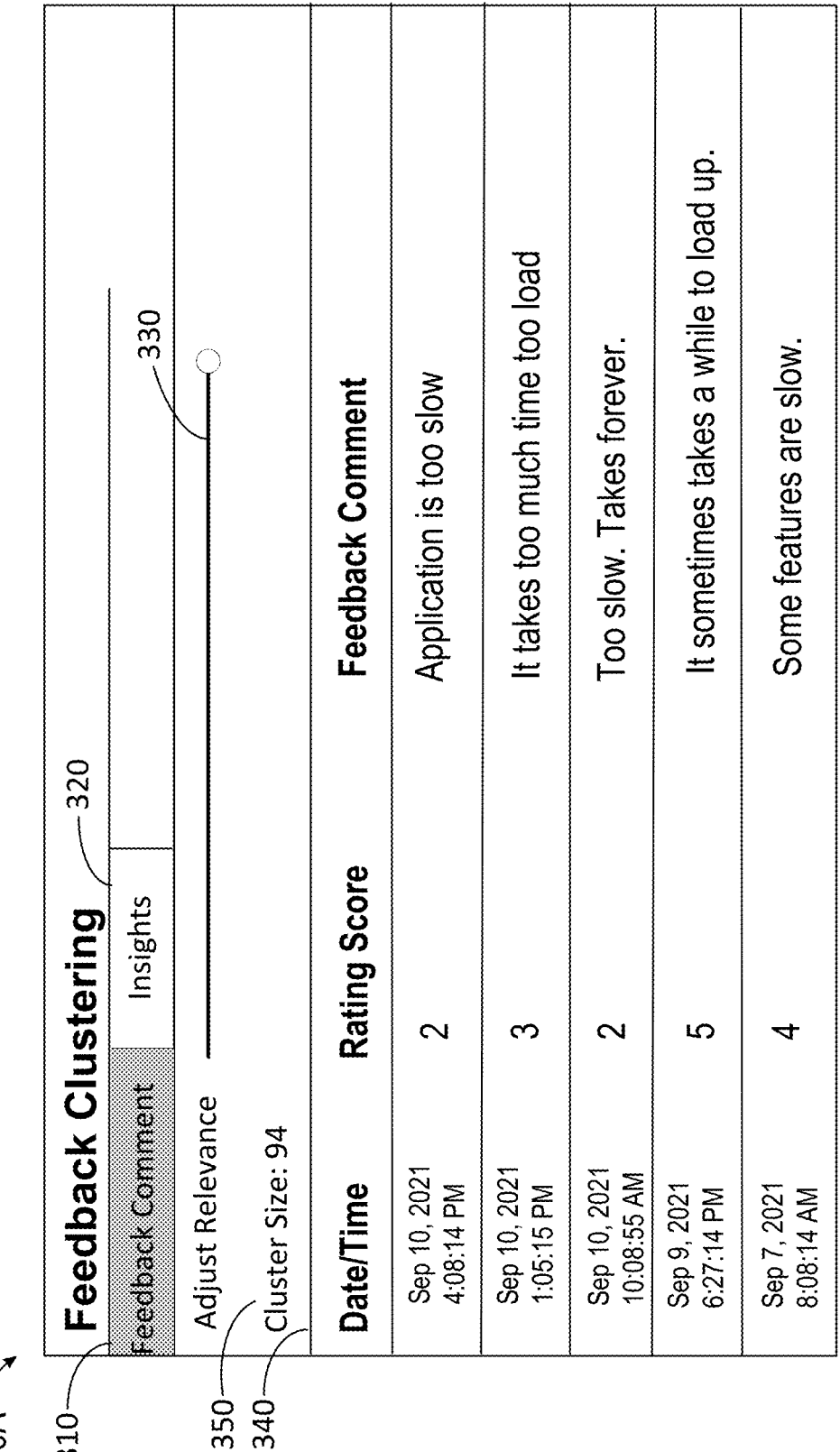
FIGS. 3A-3B depict example GUI screens of a feedback review and analysis application or service that display information about a selected cluster.
Figure 3B:
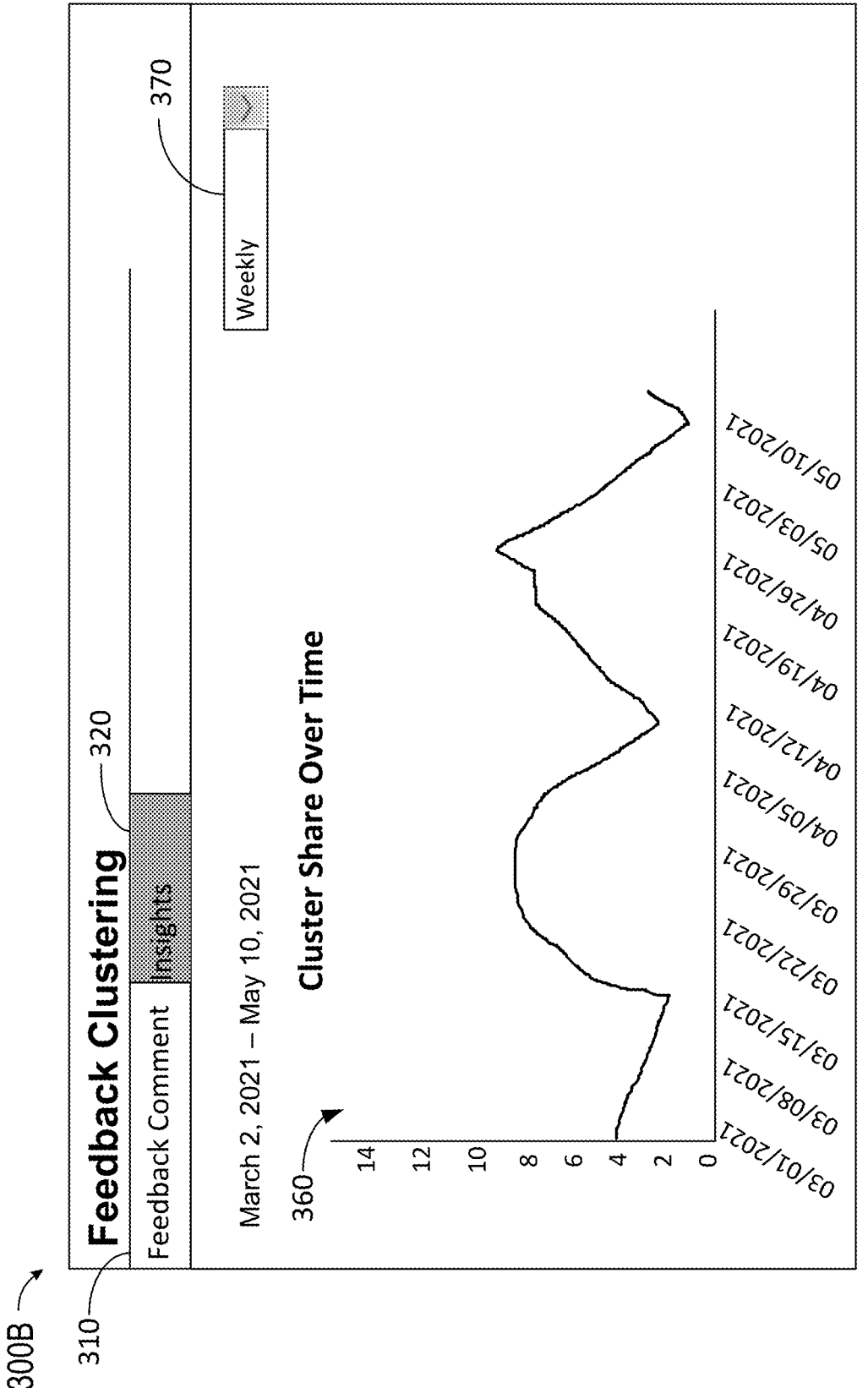

In some implementations, a given cluster can be selected for closer review. For example, the user may click on a cluster name to select that cluster. This may result in the display of a GUI screen such as the GUI screen 300A of FIG. 3A. FIGS. 3A-3B depict example GUI screens of a feedback review and analysis application or service that displays information about a selected cluster. The GUI screen 300A may display multiple tabs for reviewing information relating to a selected cluster. The tab 310 may display a list of feedback comments in a content portion 340. The list may include information about each feedback comment such as the date/time at which the feedback comment was received, the rating score associated with the feedback comment (e.g., for feedback sources that include both a rating score and written comment) and a copy of the text of the feedback comment. In some implementations, the list of feedback comments can be sorted by date, rating score and/or degree of relevance to the cluster. The GUI screen 300A may also include a UI element 350 for displaying the cluster size (e.g., the number of feedback comments in the cluster).

Furthermore, a relevance adjustment tool 330 may be provided for modifying the degree of relevance for the displayed feedback comments. The relevance adjustment tool 330 may be a sliding UI element that can be moved to adjust the relevance. For example, the relevance adjustment tool 330 may be utilized to reduce the degree of relevance, which may result in the display of more feedback comments in the content portion 340, or the relevance adjustment tool 330 may be utilized to increase the degree of relevance, which may result in fewer feedback comments being displayed. This may be achieved, as the clustering mechanism may include calculating a relevance score for each vector in the cluster. The relevance score may then be used to display feedback comments associated with a desired relevance score or range.

Selecting the insights tab 320 may result in the display of a GUI screen such as the GUI screen 300B of FIG. 3B. The GUI screen 300B may display a diagram such as the graph 360, which displays an overview of how the cluster size changed over time. The graph 360 may display the percentage of number of feedback comments in the cluster compared to the total number of feedback comments for a given time period. The time period may be adjustable via a UI element 370. For example, the time period may be on a weekly basis, daily basis, monthly basis or annual basis. When the weekly time period is selected, graph 360 may display how the percentage of feedback comments in the selected cluster changes on a weekly basis over time. The date range for the graph 360 may be the same as the date range selected on the GUI screen 200A, based on which the selected cluster was generated and may be displayed on the GUI screen 300B to enable the user to quickly identify the date range. Diagrams such as the graph 360 may enable the user to determine how feedback associated with the selected cluster has changed over time. For example, the user may be able to determine if there is an association between certain events that occurred during the time period and an increase in the number of feedback comments received. The user may also be able to determine if there has been increased or decreased user satisfaction. For example, after an identified issue is addressed (e.g., a software bug is fixed), an engineering team member may monitor the number of new feedback comments received to determine if there is a decrease in feedbacks relating to the identified issues.

In some implementations, there is no persistence in the clusters that are generated, when a request to create clusters is received. The created clusters may be removed once a revised request is received and/or the application is closed. To track status of given clusters, a feature may be provided to display keywords associated with each cluster. These keywords may be displayed on the GUI screen 300A or the GUI screen 200B. The keywords may then be used to track feedback data relating to the keyword over time.

Figure 4:
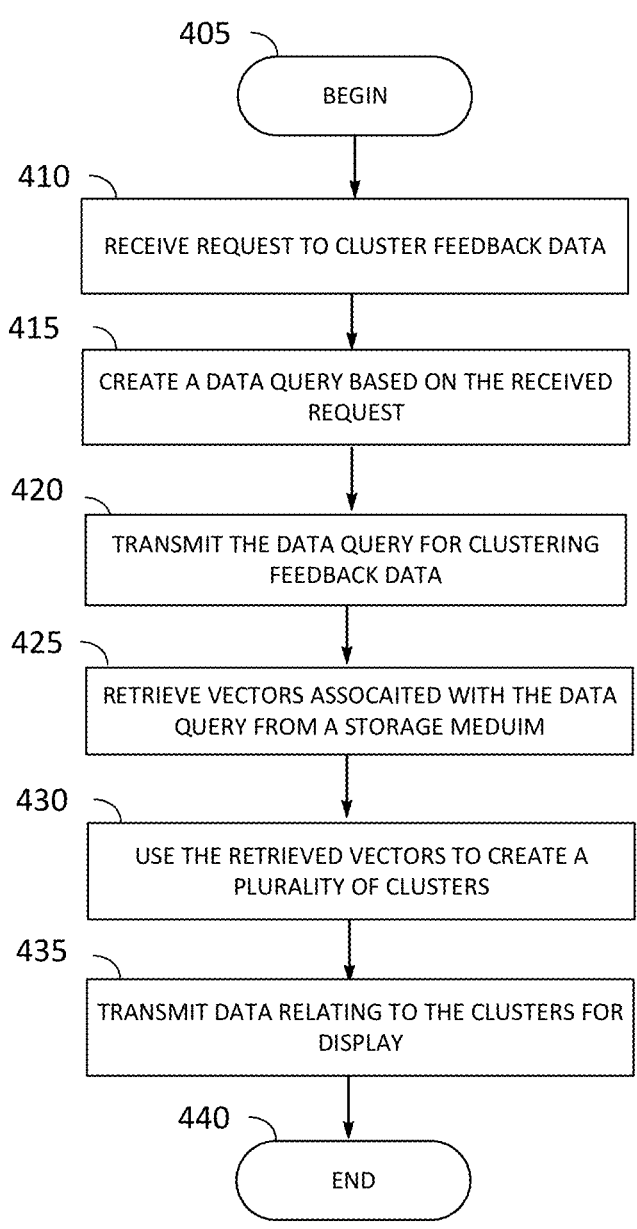
FIG. 4 is a flow diagram depicting an example method for generating one or more feedback clusters.

FIG. 4 is a flow diagram depicting an exemplary method 400 for generating one or more feedback clusters. One or more steps of the method 400 may be performed by a feedback service or preprocessing service such as the feedback service 116 or preprocessing service 114 of FIGS. 1A-1B. The method 400 may begin, at 405, and proceed to receive a request to cluster feedback data, at 410. This may occur, for example, when a user provides an input via a UI of an application or service that provides feedback review and/or analysis. The input may include one or more selected parameters for the clusters and may be provided via a client device and be transmitted via a network to a preprocessing or feedback service.

Once a request for generating clusters is received, a data query related to the selected parameters may be created, at 415. The data query may be created by accessing data in an app configuration data store to retrieve information about the model being currently used for vectorizing feedback data. After the data query is created, it may be transmitted to be used for clustering feedback data, at 420. In some implementations, this includes transmitting the data query to a model manager service which queries a feedback ID store to get feedback ID keys associated with the data query. The received feedback ID keys may then be used to retrieve matching vectors from a local storage medium, at 425. The local storage medium may be a local cache in which the latest feedback vectors are stored for quick access.

Once the matching vectors are retrieved, they may be provided to a clustering algorithm that may use the retrieved vectors to create a plurality of feedback data clusters, at 430. Information about the clusters may then be transmitted for display to the feedback review and analysis application, at 435. The information may include the number of clusters, the size of each cluster, a cluster name, sample feedback comments from the cluster and the like. The transmitted cluster information may be displayed in a UI screen of the feedback review and analysis application to enable interactive review of the feedback data. The interactions may include enabling the user to view more information about a given cluster, allowing the user to expand or collapse the clusters, enabling the user to modify the filters and the like. Once the information relating to the created clusters is transmitted to the feedback review and analysis application or service, method 400 may end, at 440.

Figure 5:
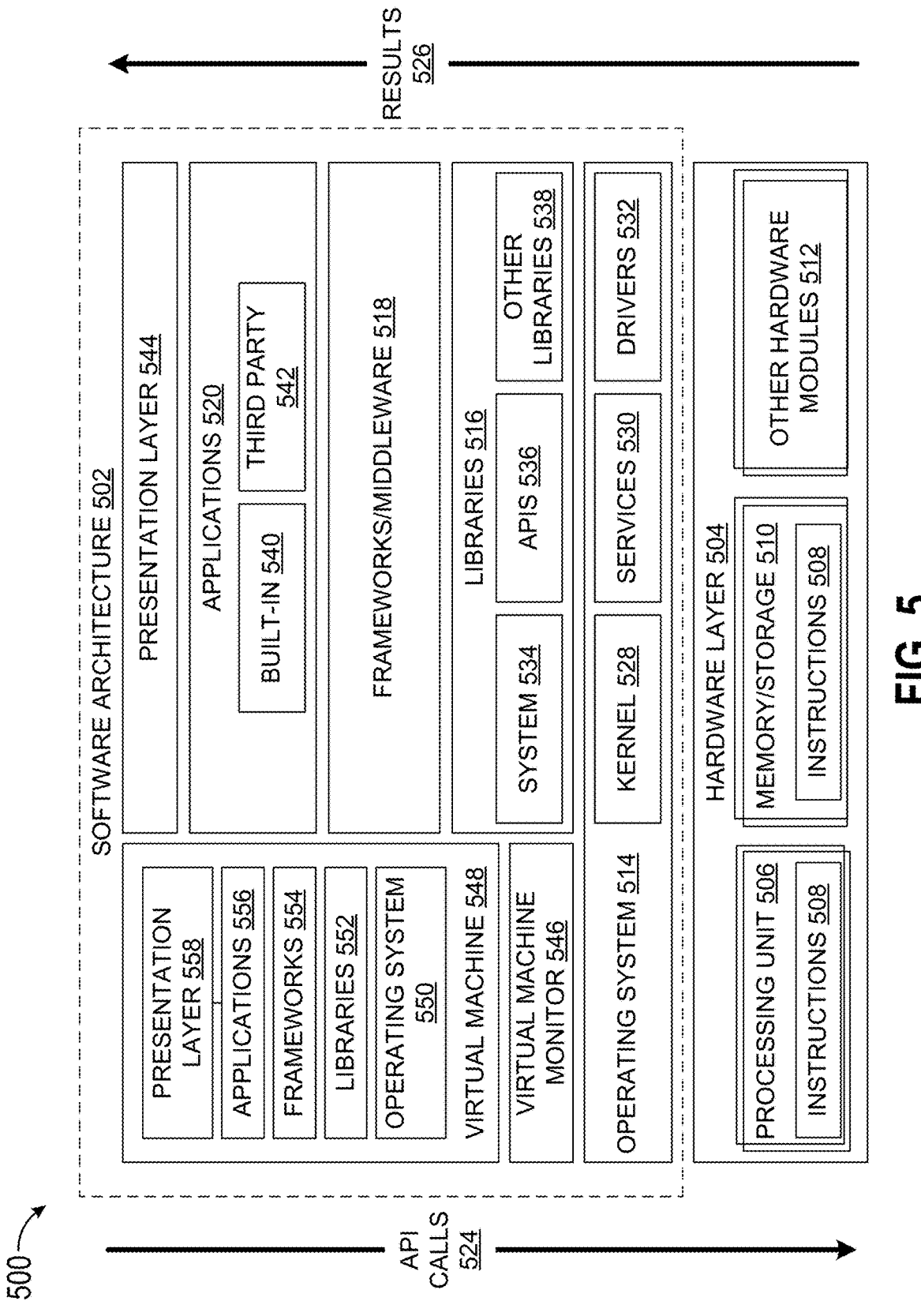
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
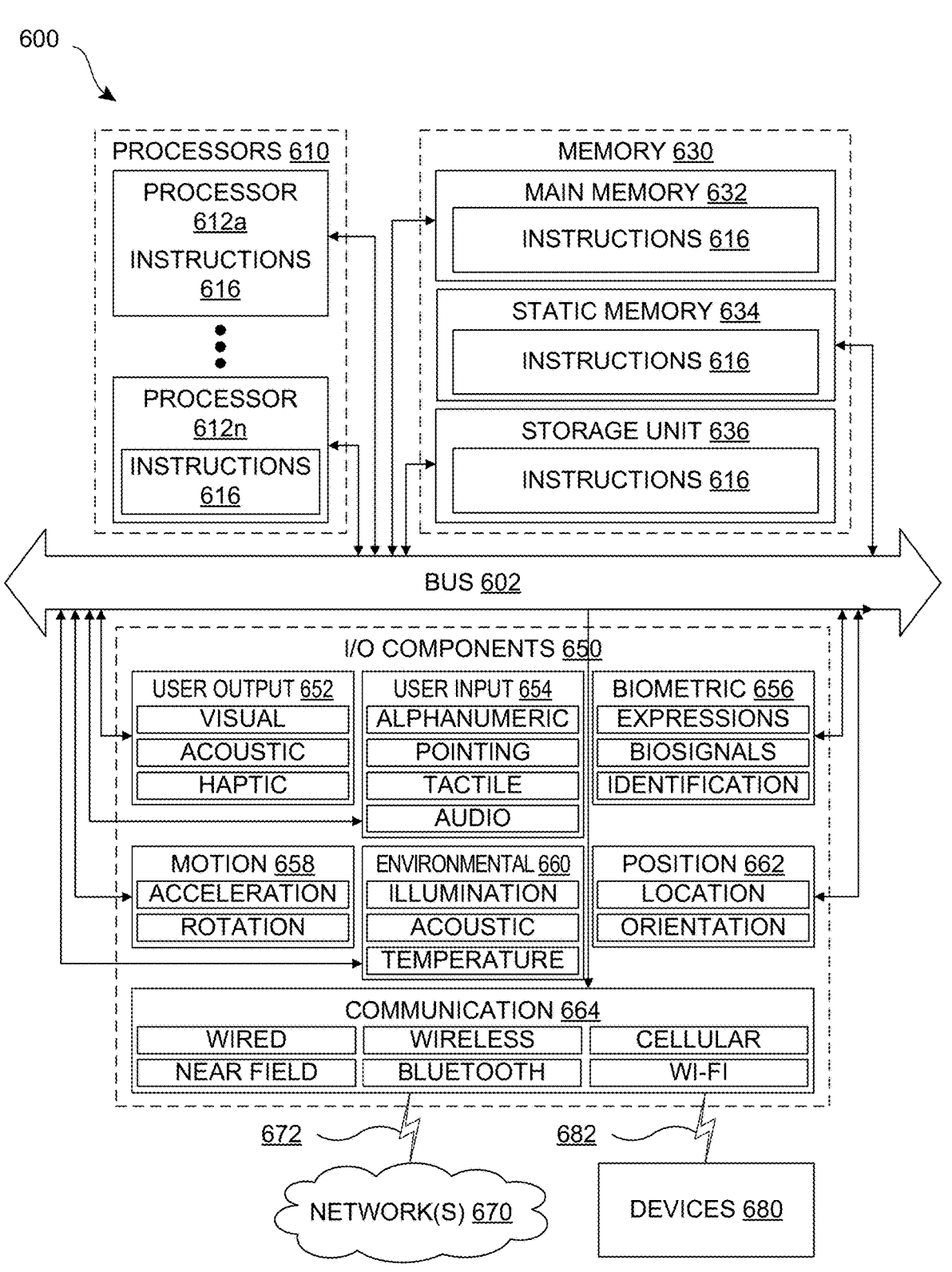
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:

a processor; and a memory in communication with the processor, the memory comprising executable instructions that, when executed by the processor, cause the data processing system to perform functions of:

receiving a request for clustering feedback data, the request including one or more parameters relating to the feedback data;

retrieving a plurality of vectorized feedbacks stored in a key value format, the key value format including a feedback identifier used as a key for each of the plurality of vectorized feedbacks;

creating a plurality of feedback clusters based on the one or more parameters and the retrieved plurality of vectorized feedbacks, the plurality of feedback clusters categorizing at least some of the feedback data into the plurality of feedback clusters; and transmitting data relating to the plurality of feedback clusters for display on a user interface screen.

Item 2. The data processing system of item 1, wherein the one or more parameters are selectable parameters and are provided for filtering the feedback data across the one or more parameters.

Item 3. The data processing system of items 1 and 2, wherein the executable instructions, when executed by the processor, further cause the data processing system to perform functions of creating a data query based at least on one of the one or more parameters.

Item 4. The data processing system of any preceding item, wherein the executable instructions, when executed by the processor, further cause the data processing system to perform functions of:

retrieving a list of a plurality of feedback identifiers based on the one or more parameters; and retrieving the plurality of vectorized feedbacks based at least in part on the plurality of feedback identifiers.

Item 5. The data processing system of item 4, wherein the list of the plurality of feedback identifiers is retrieved from a master feedback identifier data store.

Item 6. The data processing system of item 4, wherein the vectorized feedbacks are retrieved by comparing the list of the plurality of feedback identifiers with a list of vectorized feedbacks to identify vectorized feedbacks that are associated with one or more of the feedback identifiers in the list of the plurality of feedback identifiers.

Item 7. The data processing system of any preceding item, wherein the vectorized feedbacks are retrieved from a local storage medium.

Item 8. A method for generating clusters for feedback data comprising:

receiving a request for clustering feedback data, the request including one or more parameters relating to the feedback data;

retrieving a plurality of vectorized feedbacks stored in a key value format, the key value format including a feedback identifier used as a key for each of the plurality of vectorized feedbacks;

creating a plurality of feedback clusters based on the one or more parameters and the retrieved plurality of vectorized feedbacks, the plurality of feedback clusters categorizing at least some of the feedback data into the plurality of feedback clusters; and transmitting data relating to the plurality of feedback clusters for display on a user interface screen.

Item 9. The method of item 8, further comprising creating a data query based at least on one of the one or more parameters.

Item 10. The method of items 8 or 9, further comprising:

retrieving a list of a plurality of feedback identifiers based on the one or more parameters; and retrieving the plurality of vectorized feedbacks based at least in part on the plurality of feedback identifiers.

Item 11. The method of item 10, wherein the list of the plurality of feedback identifiers is retrieved from a master feedback identifier data store.

Item 12. The method of item 10, wherein the vectorized feedbacks are retrieved by comparing the list of the plurality of feedback identifiers with a list of vectorized feedbacks to identify vectorized feedbacks that are associated with one or more of the feedback identifiers in the list of the plurality of feedback identifiers.

Item 13. The method of any of items 8-12, wherein the vectorized feedbacks are retrieved from a local storage medium.

Item 14. The method of any of items 8-12, wherein the vectorized feedbacks are created by creating vector representations of received feedback data in near real-time.

Item 15. The method of any of items 8-12, wherein the vectorized feedbacks are created offline.

Item 16. A non-transitory computer readable medium on which are stored instructions that, when executed, cause a programmable device to:

receive a request for clustering feedback data, the request including one or more parameters relating to the feedback data;

retrieve a plurality of vectorized feedbacks stored in a key value format, the key value format including a feedback identifier used as a key for each of the plurality of vectorized feedbacks;

create a plurality of feedback clusters based on the one or more parameters and the retrieved plurality of vectorized feedbacks, the plurality of feedback clusters categorizing at least some of the feedback data into the plurality of feedback clusters; and transmit data relating to the plurality of feedback clusters for display on a user interface screen.

Item 17. The non-transitory computer readable medium of item 16, wherein the instructions when executed, further cause a programmable device to create a data query based at least on one of the one or more parameters.

Item 18. The non-transitory computer readable medium of items 16 or 17, wherein the instructions when executed, further cause a programmable device to perform functions of:

retrieving a list of a plurality of feedback identifiers based on the one or more parameters; and retrieving the plurality of vectorized feedbacks based at least in part on the plurality of feedback identifiers.

Item 19. The non-transitory computer readable medium of item 18, wherein the list of the plurality of feedback identifiers is retrieved from a master feedback identifier data store.

Item 20. The non-transitory computer readable medium of item 18, wherein the vectorized feedbacks are retrieved by comparing the list of the plurality of feedback identifiers with a list of vectorized feedbacks to identify vectorized feedbacks that are associated with one or more of the feedback identifiers in the list of the plurality of feedback identifiers.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory in communication with the processor, the memory comprising executable instructions that, when executed by the processor, cause the data processing system to perform functions of:

ingesting new vectorized feedback entries from a long-term table database into a key-value database cache of feedback data, wherein each vectorized feedback entry in the table database includes feedback text vectorized across one or more vector dimensions, a unique feedback identifier (ID), and a model version number associated with a model used to vectorize each vectorized feedback entry, and the ingesting includes organizing the new vectorized feedback entries into a key-value format with a key composed of each new vectorized feedback entry's corresponding feedback ID and model version number and with a value storing the corresponding vectorized feedback text;

purging the key-value database cache of old vectorized feedback entries based on the model version numbers in the key of the key-value format, where the old vectorized feedback entries were generated during a time frame indicated by the model version number stored in each vectorized feedback entry's key in the key-value database cache;

presenting, in a first element of a feedback clustering user interface (UI), a list of a first plurality of feedback clusters of the feedback data in the key-value database;

receiving a request for a revised clustering of the feedback data from the feedback clustering UI, the request including one or more filter parameters relating to the vector dimensions of the vectorized feedback data specified in a second element of the feedback clustering UI;

filtering the key-value database cache to generate a filtered feedback list including a plurality of feedback IDs of feedback entries in the cache matching the one or more filter parameters;

creating a second plurality of feedback clusters describing a subset of entries in the cache based on the filtered feedback list, the second plurality of feedback clusters categorizing at least some of the feedback data in the subset into the second plurality of feedback clusters; and in response to the request, replacing the list of the first plurality of feedback clusters with the second plurality of feedback clusters in the first element of the feedback clustering UI.

2. The data processing system of claim 1, wherein the executable instructions, when executed by the processor, further cause the data processing system to perform functions of creating a data query based at least on one of the one or more parameters.

3. The data processing system of claim 1, wherein the executable instructions, when executed by the processor, further cause the data processing system to perform functions of:

retrieving a list of a plurality of feedback identifiers based on the one or more parameters; and retrieving the plurality of vectorized feedback clusters based at least in part on the plurality of feedback identifiers.

4. The data processing system of claim 3, wherein the list of the plurality of feedback identifiers is retrieved from a master feedback identifier data store.

5. The data processing system of claim 3, wherein the vectorized feedbacks are retrieved by comparing the list of the plurality of feedback identifiers with a list of vectorized feedbacks to identify vectorized feedbacks that are associated with one or more of the feedback identifiers in the list of the plurality of feedback identifiers.

6. The data processing system of claim 1, wherein the vectorized feedbacks are retrieved from a local storage medium.

7. The data processing system of claim 1, wherein the long-term table database includes both the vectorized feedback entries and older vectorized feedback entries, and wherein the cache is purged of one or more of the older vectorized feedback entries.

8. The data processing system of claim 1, wherein the feedback data is vectorized using a model having a changing version, each of the vectorized feedback entries include a model version number used for its creation, and the cache is purged of entries based on the model version number.

9. A method for generating clusters for feedback data comprising:

ingesting new vectorized feedback entries from a long-term table database into a key-value database cache of feedback data, wherein each vectorized feedback entry in the table database includes feedback text vectorized across one or more vector dimensions, a unique feedback identifier (ID), and a model version number associated with a model used to vectorize each vectorized feedback entry, and the ingesting includes organizing the new vectorized feedback entries into a key-value format with a key composed of each new vectorized feedback entry's corresponding feedback ID and model version number and with a value storing the corresponding vectorized feedback text;

purging the key-value database cache of old vectorized feedback entries based on the model version numbers in the key of the key-value format, where the old vectorized feedback entries were generated during a time frame indicated by the model version number stored in each vectorized feedback entry's key in the key-value database cache;

presenting, in a first user interface (UI) element of a feedback clustering UI, a list of a first plurality of feedback clusters of the feedback data in the key-value database;

receiving a request for a revised clustering of the feedback data from the feedback clustering UI, the request including one or more filter parameters relating to the vector dimensions of the vectorized feedback data specified in a second element of the feedback clustering UI;

filtering the key-value database cache to generate a filtered feedback list including a plurality of feedback IDs of feedback entries in the cache matching the one or more filter parameters;

creating a second plurality of feedback clusters describing a subset of entries in the cache based on the filtered feedback list, the second plurality of feedback clusters categorizing at least some of the feedback data in the subset into the second plurality of feedback clusters; and in response to the request, replacing the list of the first plurality of feedback clusters with the second plurality of feedback clusters in the first element of the feedback clustering UI.

10. The method of claim 9, further comprising creating a data query based at least on one of the one or more parameters.

11. The method of claim 9, further comprising:

retrieving a list of a plurality of feedback identifiers based on the one or more parameters; and retrieving the plurality of vectorized feedback clusters based at least in part on the plurality of feedback identifiers.

12. The method of claim 11, wherein the list of the plurality of feedback identifiers is retrieved from a master feedback identifier data store.

13. The method of claim 11, wherein the vectorized feedbacks are retrieved by comparing the list of the plurality of feedback identifiers with a list of vectorized feedbacks to identify vectorized feedbacks that are associated with one or more of the feedback identifiers in the list of the plurality of feedback identifiers.

14. The method of claim 9, wherein the vectorized feedbacks are retrieved from a local storage medium.

15. A non-transitory computer readable medium on which are stored instructions that, when executed, cause a programmable device to:

ingest new vectorized feedback entries from a long-term table database into a key-value database cache of feedback data, wherein each vectorized feedback entry in the table database includes feedback text vectorized across one or more vector dimensions, a unique feedback identifier (ID), and a model version number associated with a model used to vectorize each vectorized feedback entry, and the ingesting includes organizing the new vectorized feedback entries into a key-value format with a key composed of each new vectorized feedback entry's corresponding feedback ID and model version number and with a value storing the corresponding vectorized feedback text;

purge the key-value database cache of old vectorized feedback entries based on the model version numbers in the key of the key-value format, where the old vectorized feedback entries were generated during a time frame indicated by the model version number stored in each vectorized feedback entry's key in the key-value database cache;

present in a first user interface (UI) element of a feedback clustering UI, a list of a first plurality of feedback clusters of the feedback data in the key-value database;

receive a request for a revised clustering of the feedback data from the feedback clustering UI, the request including one or more filter parameters relating to the vector dimensions of the vectorized feedback data specified in a second element of the feedback clustering UI;

filter the key-value database cache to generate a filtered feedback list including a plurality of feedback IDs of feedback entries in the cache matching the one or more filter parameters;

create a second plurality of feedback clusters describing a subset of entries in the cache based on the filtered feedback list, the second plurality of feedback clusters categorizing at least some of the feedback data in the subset into the second plurality of feedback clusters; and in response to the request, replace the list of the first plurality of feedback clusters with the second plurality of feedback clusters in the first element of the feedback clustering UI.

16. The non-transitory computer readable medium of claim 15, wherein the instructions when executed, further cause a programmable device to create a data query based at least on one of the one or more parameters.

17. The non-transitory computer readable medium of claim 15, wherein the instructions when executed, further cause a programmable device to perform functions of:

retrieving a list of a plurality of feedback identifiers based on the one or more parameters; and retrieving the plurality of vectorized feedback clusters based at least in part on the plurality of feedback identifiers.

18. The non-transitory computer readable medium of claim 17, wherein the list of the plurality of feedback identifiers is retrieved from a master feedback identifier data store.

19. The non-transitory computer readable medium of claim 17, wherein the vectorized feedbacks are retrieved by comparing the list of the plurality of feedback identifiers with a list of vectorized feedbacks to identify vectorized feedbacks that are associated with one or more of the feedback identifiers in the list of the plurality of feedback identifiers.

* * * * *